United States Patent
Minter (12) 
(10) Patent No.: US 6,560,588 B1
(45) Date of Patent: May 6, 2003

(54) METHOD AND APPARATUS FOR IDENTIFYING ITEMS OF INFORMATION FROM A MULTI-USER INFORMATION SYSTEM

(75) Inventor: Andrew George Minter, Hertfordshire (GB)

(73) Assignee: Nortel Networks Limited, St. Laurent (CA)

( * ) Notice: Subject to any disclaimer, the term of this patent is extended or adjusted under 35 U.S.C. 154(b) by 747 days.

(21) Appl. No.: 08/960,787

(22) Filed: Oct. 30, 1997

(51) Int. Cl.⁷ ................................ G06N 5/02
(52) U.S. Cl. .................... 706/50; 706/50; 707/100; 707/513
(58) Field of Search ................ 395/710, 712; 706/45, 50; 707/5, 100, 513; 705/10, 8; 345/331; 717/100

(56) References Cited

U.S. PATENT DOCUMENTS

| | | | |
|---|---|---|---|
| 5,537,586 A | | 7/1996 | Amram et al. |
| 5,640,553 A | * | 6/1997 | Schultz .......................... 707/5 |
| 5,796,395 A | * | 8/1998 | De Hond .................... 345/331 |
| 5,835,087 A | * | 11/1998 | Herz et al. .................. 345/327 |
| 5,848,396 A | * | 12/1998 | Gerace ........................ 705/10 |
| 6,012,053 A | * | 1/2000 | Pant et al. ..................... 707/3 |
| 6,016,478 A | * | 1/2000 | Zhang et al. .................. 705/9 |
| 6,038,560 A | * | 3/2000 | Wical ............................ 707/5 |
| 6,112,212 A | * | 8/2000 | Heitler ....................... 707/501 |
| 6,182,056 B1 | * | 1/2001 | St. Jacques et al. .......... 706/11 |
| 6,182,227 B1 | * | 1/2001 | Blair et al. .................. 713/201 |
| 6,256,648 B1 | * | 7/2001 | Hill et al. ..................... 707/5 |
| 6,353,825 B1 | * | 3/2002 | Ponte ............................ 707/5 |

FOREIGN PATENT DOCUMENTS

| | | |
|---|---|---|
| WO | WO 95/29451 | 11/1995 |
| WO | WO 96/29661 | 9/1996 |
| WO | WO 97/26729 | 7/1997 |

OTHER PUBLICATIONS

Bishop, "Making digital libraries go: Comparing use across genres", ACM DL, pp 94–103, 1999.*

Duane et al, "Managing intranet technology in a organizational context: towards a stages of growth model for balancing empowerment and control", ACM Proc. of 21 Int. conf. of Inf. syst. pp 242–258, Dec. 2000.*

Divitini et al, Intenet based groupware for user participation in product development, ACM SIGCHI Bulletin, vol. 32, No. 1, pp 31–35, Jan. 2000.*

Natvig et al., Modeling shared infromation spaces(SIS), ACM Group , pp 199–208, 1999.*

Thomas et al., "Using agents to personalize the Web", IUI–ACM, pp 53–60, 1997.*

* cited by examiner

Primary Examiner—Anil Khatri
(74) Attorney, Agent, or Firm—Barnes & Thornburg (57) ABSTRACT

A method and apparatus for identifying items of information from an information system which is especially useful for identifying information from the World Wide Web. The information items have not been seen by the user before and are relevant and interesting to the user. A first record of items requested by each member of a group of users is obtained. A second record is obtained of items requested more than once by the same user. Pairs of users in the group are analyzed, and said to be "friends" if they have requested some of the same information from the second record. Information that has been requested by a user's friend but which has not been seen by the user before is identified for that user.

7 Claims, 6 Drawing Sheets

Aug 11 14:30 1997 findalike Page 1

*Fig. 3a*

```perl
1.      #!/WWW/bin/perl
2.
3.      $minscore = 7;              # Need this % of sites in common to be a friend
4.      $maxfriends = 20;  # Look at a maximum of this number of friends
5.      $maxposs = 3;               # Suggest up to this many possibilities
6.      $minshared = 4;             # Possible sites need to have been seen by this many
7.
8.      $data = "/WWW/etc/cool/cool.data";
9.      $seen = "/WWW/etc/cool/cool.seen";
10.
11.     $datadir = "/WWW/etc/cool/cool";
12.     $newdir = "/WWW/etc/cool/cool.new";
13.     $olddir = "/WWW/etc/cool/cool.old";
14.
15.     system("rm -rf $newdir");
16.     mkdir($newdir, 0755);
17.
18.     open(DATA, "<$data");
19.     while ($line = <DATA>)
20.     {
21.        chop $line;
22.        ($host, $site) = split(' ', $line);
23.        if ($interested{$host} eq "")
24.        {
25.            $interested{$host} = $site;
26.        }
27.        else
28.        {
29.            $interested{$host} = "$interested{$host} $site";
30.        }
31.     }
32.     close(DATA);
33.
34.     open(SEEN, "<$seen");
35.     while ($line = <SEEN>)
36.     {
37.        chop $line;
38.        ($host, $site) = split(' ', $line);
39.        if ($seen{$host} eq "")
40.        {
41.            $seen{$host} = $site;
42.        }
43.        else
44.        {
45.            $seen{$host} = "$seen{$host} $site";
46.        }
47.     }
48.     close(SEEN);
49.
50.     foreach $host1 (sort keys(%seen))
51.     {
52.     #   $host1 = "bhars582.europe.nortel.com";
53.        print ("Host: $host1\n");
54.
55.        # Process the data
```

Aug 11 14:30 1997 findalike Page 2

*Fig. 3b*

```
57.        undef @friends;
58.
59.        foreach $host2 (keys(%interested))
60.        {
61.           next if ($host1 eq $host2);
62.
63.           @sites1 = split(' ', $interested{$host1});
64.           @sites2 = split(' ', $interested{$host2});
65.
66.           $sites = scalar(@sites1) + scalar(@sites2);
67.
68.           $common = 0;
69.           foreach $s1 (@sites1)
70.           {
71.              foreach $s2 (@sites2)
72.              {
73.                    ++$common if ($s1 eq $s2);
74.              }
75.           }
76.
77.           $sites -= $common;
78.           $score = int(100 * $common / $sites);
79.
80.           if ($score > $minscore)
81.           {
82.              @friends = (@friends, "$host2=$score");
83.           }
84.        }
85.
86.        @mysites = split(' ', $seen{$host1});
87.
88.        print " Has seen ", scalar(@mysites), " site(s)\n";
89.
90.        undef %mysite;
91.        foreach $site (@mysites)
92.        {
93.           $mysite{$site} = 1;
94.        }
95.
96.        undef %friendsites;
97.
98.        @friends = sort order @friends;
99.
100.       $count = 0;
101.
102.     friend:
103.       foreach $rec (@friends)
104.       {
105.          local($friend, $score, @hissites);
106.
107.          $rec =~ /(.*)=([0-9]+)$/;
108.          $friend = $1;
109.          $score = $2;
110.
111.    #     print " $friend, score $score%\n";
112.
```

Aug 11 14:30 1997 findalike Page 3

*Fig. 3c*

```
113.        @hissites = split(' ', $interested{$friend});
114.        foreach $site (@hissites)
115.        {
116.            ++ $friendsites{$site} if ! $mysite{$site};
117.        }
118.
119.        ++ $count;
120.
121.        last friend if $count == $maxfriends;
122.    }
123.
124.    print " Processed $count friends\n";
125.
126.    if ($count < $minshared)
127.    {
128.        print " Not enough friends (sad person)\n\n";
129.        next;
130.    }
131.
132.    undef @score;
133.    foreach $site (keys(%friendsites))
134.    {
135.        if ($friendsites{$site} >= $minshared)
136.        {
137.            push @score, "$site=$friendsites{$site}";
138.        }
139.    }
140.
141.    print " Built scores array, size = ", scalar(@score), "\n";
142.
143.    @score = sort order @score;
144.
145.    if (scalar(@score) == 0)
146.    {
147.        print " Sorry, no suggestions!\n\n";
148.        next;
149.    }
150.
151.    open(OUT, ">$newdir/$host1");
152.
153.    $count = 0;
154.
155.    possible:
156.      foreach $poss (@score)
157.      {
158.        local($site, $score);
159.
160.        $poss =~ /(.*)=([0-9]+)$/;
161.        $site = $1;
162.        $score = $2;
163.
164.        last possible if $score < $minshared;
165.
166.        print " Possible: $site, score $score\n";
167.        print OUT "$site\n";
```

*Fig. 3d*

Aug 11 14:30 1997 findalike Page 4

```
168.        ++ $count;
169.
170.        last possible if $count == $maxposs;
171.      }
172.
173.      close(OUT);
174.
175.      print " Done.\n\n";
176.    }
177.
178.    system("rm -rf $olddir");
179.    rename($datadir, $olddir);
180.    rename($newdir, $datadir);
181.
182.    sub order
183.    {
184.      local($s1, $s2);
185.
186.      $a =~ /=([0-9]+)$/;
187.      $s1 = $1;
188.      $b =~ /=([0-9]+)$/;
189.      $s2 = $1;
190.
191.      return $s2 - $s1;
192.    }
```

Aug 11 14:30 1997 getdata Page 1

*Fig. 4*

```perl
1.    #!/WWW/bin/perl
2.
3.    $log = "/tools/bin/gunzip < /WWW/logs/historical/proxy-1997Q2.gz; cat /WWW/logs/proxy.log;";
4.    $data = "/WWW/etc/cool/cool.data";
5.    $seen = "/WWW/etc/cool/cool.seen";
6.    $tmp1 = "/tmp/finderA$$";
7.    $tmp2 = "/tmp/finderB$$";
8.
9.    open(LOG, "$log |");
10.   open(TMP1, ">$tmp1");
11.   while ($line = <LOG>)
12.   {
13.      chop $line;
14.      if ($line =~ /^([^ ]*) .* (\[.*\]).* "GET http:VV([^V ]*)/)
15.      {
16.         $host = $1;
17.         $date = $2;
18.         $site = $3;
19.
20.         $host =~ s/bnr.co.uk/europe.nortel.com/;
21.         $site =~ s/:80$//;
22.
23.         $date =~ /^.(...........)/;
24.         $day = $1;
25.
26.         print TMP1 "$host $site $day\n";
27.      }
28.   }
29.   close(LOG);
30.   close(TMP1);
31.
32.   # tmp1 now has data in "host site date" format
33.
34.   system("sort < $tmp1 | uniq > $tmp2");
35.   unlink($tmp1);
36.
37.   # Now get all requests "seen" file
38.   system("sed 's/ .[^ ]*\$//' < $tmp2 | uniq > $seen");
39.
40.   # Now get the requests that appeared on more than one day into data file
41.   system("sed 's/ .[^ ]*\$//' < $tmp2 | uniq -d > $data");
42.
43.   unlink($tmp2);
```

METHOD AND APPARATUS FOR IDENTIFYING ITEMS OF INFORMATION FROM A MULTI-USER INFORMATION SYSTEM

BACKGROUND OF THE INVENTION

1. Field of the Invention

This invention relates to a method and apparatus for identifying items of information from an information system which is especially useful for identifying information from the world wide web.

2. Description of the Prior Art

The world wide web and many other information systems contain vast amounts of information. It is hard for users to keep up with new information that may be relevant to them because of the difficulty of doing searches. The user needs to spend valuable time planning and constructing search strategies and ensuring these are kept up to date as new terminology comes into use. Even when this task has been completed, the search needs to be run and then the results managed. Many irrelevant items may be found in the search and the user still needs to spend valuable time evaluating these and pinpointing relevant items. Because of these problems many of the advantages of the information system are lost. The user finds the system too difficult to use or manage and does not gain the maximum benefit from the information system.

Known systems that have been developed to find relevant information on behalf of users include those based on profiles. These systems build up a profile of the user which is a description of the types of information that s/he is interested in and then use this profile as a gauge against which to assess the relevance of a piece of information to the user. However, these systems are problematic because in order to be effective the profiles have to accurately reflect the interests of the user. Consequently the profiles are difficult to create and maintain as the user's interests change and adapt. Also, these systems are typically used in conjunction with a conventional search process and the profiles are used to prioritise or filter the search results before presentation to the user. This means that the whole process is still limited by the performance of the conventional search process in finding the required information quickly and without finding spurious information. Conventional search processes are designed to search, for example, a database or an index of terms. However, for unstructured, large systems like the world wide web conventional search processes are difficult to implement.

International patent application number WO 96/29661 in the name of Interval Research Corporation describes a system for the retrieval of hyperlinked information resources using heuristics. In this system a first "exploration" heuristic is used to search an information system (such as a network of linked textual or multi-media information) and this process finds at least one information resource for presentation to the user. Then a second "presentation" heuristic is used to present selected resources to the user and the user provides feedback indicative of the degree of relevance of the presented information in the form of a rating, score, or binary parameter, such as yes/no. The first and second heuristics are then modified on the basis of the ranking functions. This process is disadvantageous because it requires the user to provide relevance feedback which is time consuming. Also, the system searches the information system itself which makes it less useful for large unstructured databases.

International application number WO 95/29451 in the name of Apple Computer, Inc. describes a system for ranking the relevance of information objects accessed by computer users. This system involves storing a profile of interests for each user having access to the system and items of information are displayed in order of ranking. This means that the system has the disadvantages of "profile" systems as described above. Also, this system is not intended to be used to search large databases but rather is designed for use with electronic mail messages and bulletin board systems.

U.S. Pat. No. 5,537,586 describes a method for extracting a preferred set of textual records from a database. However, this is fundamentally a criteria-based search system. It will not find data that is not indexed and it relies on maintaining a search profile for each user.

International Patent Application Number WO 97/26729 describes a system for identifying which advertisements to present to a particular user of the world wide web. Using a "Smart Ad Box" simultaneous viewers of the same web page can be presented with different advertisements and this document describes a way in which advertisers can decide which of a number of adverts to present. In order to do this a measure of similarity between several individual users of the World Wide Web is generated. For one user the individuals with the greatest calculated similarity to that user become that user's community. The system then determines which advertisements to show to the user based on characteristics of that user's community.

This system is designed for identifying advertisements from a limited number of possible items, rather than for identifying any items of potential interest from the whole World Wide Web. Also, under this system, users are presented with advertisements that they have previously seen. The system is described as being used in conjunction with demographic data such as the age and domicile of a user. This is similar to profile based systems and is therefore subject to the same disadvantages. The demographic data is complex to obtain, maintain and use.

It is accordingly an object of the present invention to provide an apparatus and method for identifying items of information from an information system which overcomes or at least mitigates one or more of the problems noted above.

SUMMARY OF THE INVENTION

According to a first aspect of the present invention there is provided a method of identifying items of information from an information system, for at least one of a group of users of the information system, said method comprising the steps of:

(i) obtaining a first record of items of information requested from the information system by each user in the group;

(ii) obtaining a second record of items of information requested from the information system on more than one occasion by the same user;

(iii) determining a score for each pair of users in the group said score being determined on the basis of a number of items from the second record requested by one user in the pair, that were also requested by the other user in the pair;

(iv) for each user allocating one or more group members as friends for that user on the basis of the scores for pairs containing that user; and (v) for each user identifying items of information that have been requested by a friend of the user that have not been requested by the user.

The invention also encompasses a corresponding apparatus for identifying items of information from an information system, for at least one of a group of users of the information system, said apparatus comprising:

(i) an obtainer arranged to obtain a first record of items of information requested from the information system by each user in the group and also to obtain a second record of items of information requested from the information system on more than one occasion by the same user;

(ii) a determiner arranged to determine a score for each pair of users in the group said score being determined on the basis of a number of items from the second record requested by one user in the pair, that were also requested by the other user in the pair;

(iii) an allocator arranged to allocate, for each user, one or more group members as friends for that user on the basis of the scores for pairs containing that user; and (iv) an identifier arranged to identify, for each user, items of information that have been requested by a friend of the user that have not been requested by the user.

A corresponding information system is also provided comprising an apparatus for identifying items of information from the information system, for at least one of a group of users of the information system, said apparatus comprising:

(i) an obtainer arranged to obtain a first record of items of information requested from the information system by each user in the group and also to obtain a second record of items of information requested from the information system on more than one occasion by the same user;

(ii) a determiner arranged to determine a score for each pair of users in the group said score being determined on the basis of a number of items from the second record requested by one user in the pair, that were also requested by the other user in the pair;

(iii) an allocator arranged to allocate, for each user, one or more group members as friends for that user on the basis of the scores for pairs containing that user; and (iv) an identifier arranged to identify, for each user, items of information that have been requested by a friend of the user that have not been requested by the user.

This method, apparatus and system each provide the advantage that "interesting" information that a user has not previously requested is identified. The user does not have to spend time searching for information and is quickly and simply provided with new information that is potentially interesting. This helps the user to cope with and make use of the ever-increasing amount and variety of available information in the information system (for example, the world wide web). Information is identified for both novice and expert users of the information system and information-finding tasks of various kinds are aided, for example, answering a particular query, or casually browsing or surfing for information of interest in the absence of a specific query. Advantageously, no user profiles are created or maintained which greatly simplifies the process and helps to reduce errors that may arise and no demographic data needs to be obtained, maintained or used. Also, no actual search process is carried out and no access to the information system itself is needed. Information is identified by reference to information that other members of a group of users have requested. This means that no complex and lengthy search processes need to be carried out and the method is suitable for large unstructured information systems such as the world wide web as well as well organised data bases.

Another advantage is that, by using the second record, information identified for each user is removed from the identification process unless it is requested more than once by the same user. This helps to avoid suggesting things to users simply because these have previously been suggested to that user's friend(s). This is especially important when the method has been repeated several times. Also, use of the second record in conjunction with the first record was found to produce unexpectedly good results. Users were presented with items identified by the system that were particularly useful and the number of irrelevant or uninteresting items was reduced.

DETAILED DESCRIPTION OF THE INVENTION

Embodiments of the present invention are described below by way of example only. These examples represent the best ways of putting the invention into practice that are currently known to the Applicant although they are not the only ways in which this could be achieved.

Figure 1:
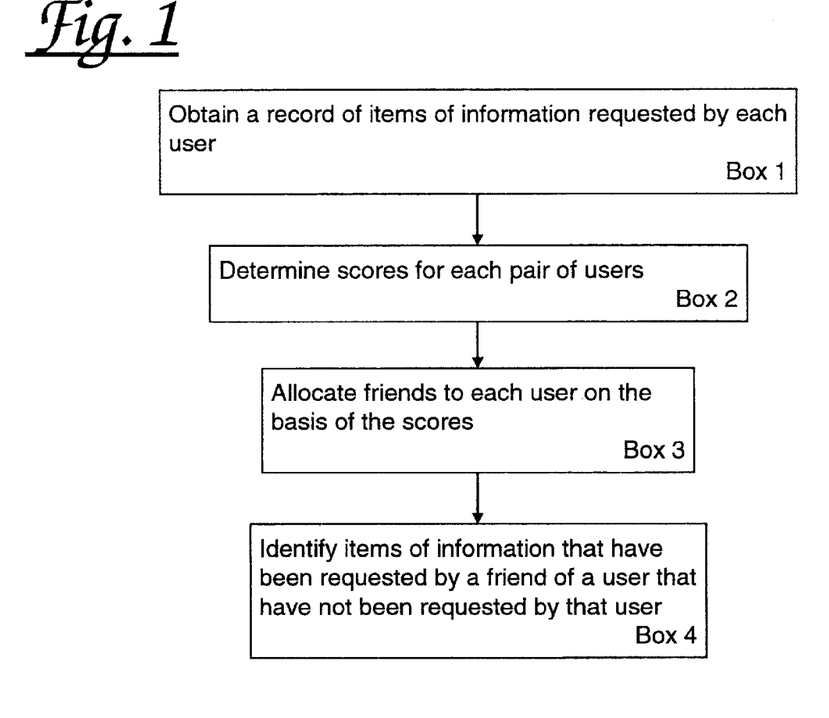
FIG. 1 is a flow chart illustrating a main sequence of steps for identifying information.

FIG. 1 shows the main steps for a method for identifying information. The method is for use with a group of users of an information system. That is, it would not be practical to use the method for only 2 or a small group of users. The method can be used with as large a group of users as possible, given the limitations of processing power of the computer system or other apparatus that is used to implement the method. For example, the method has been successfully implemented for 80 users with a conventional computer system. Smaller groups of users could also be used.

The term "information system" is used to refer to any source of items of information that may be similar or diverse in subject matter and type, that can be accessed by several users and for which a log or record of that access can be obtained. For example, an electronic database, an index of items, the world wide web, a library and an encyclopaedia.

The method is designed to identify items of information for one or more users of the information system. The idea is to identify items that a particular user may find interesting or useful and which they otherwise might not have found. The user is directed to new areas of information which they can then investigate further. This is achieved without the need for a search to be performed or for complex information about the preferences and interests of particular users to be stored and maintained.

Figure 2:
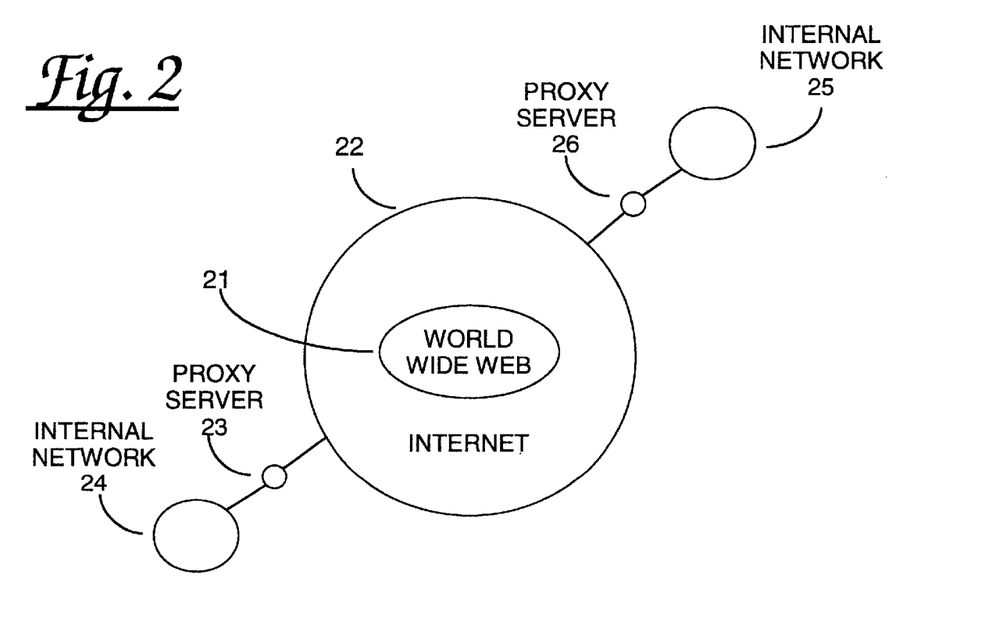
FIG. 2 is a schematic diagram of the world wide web.
Figure 3A:
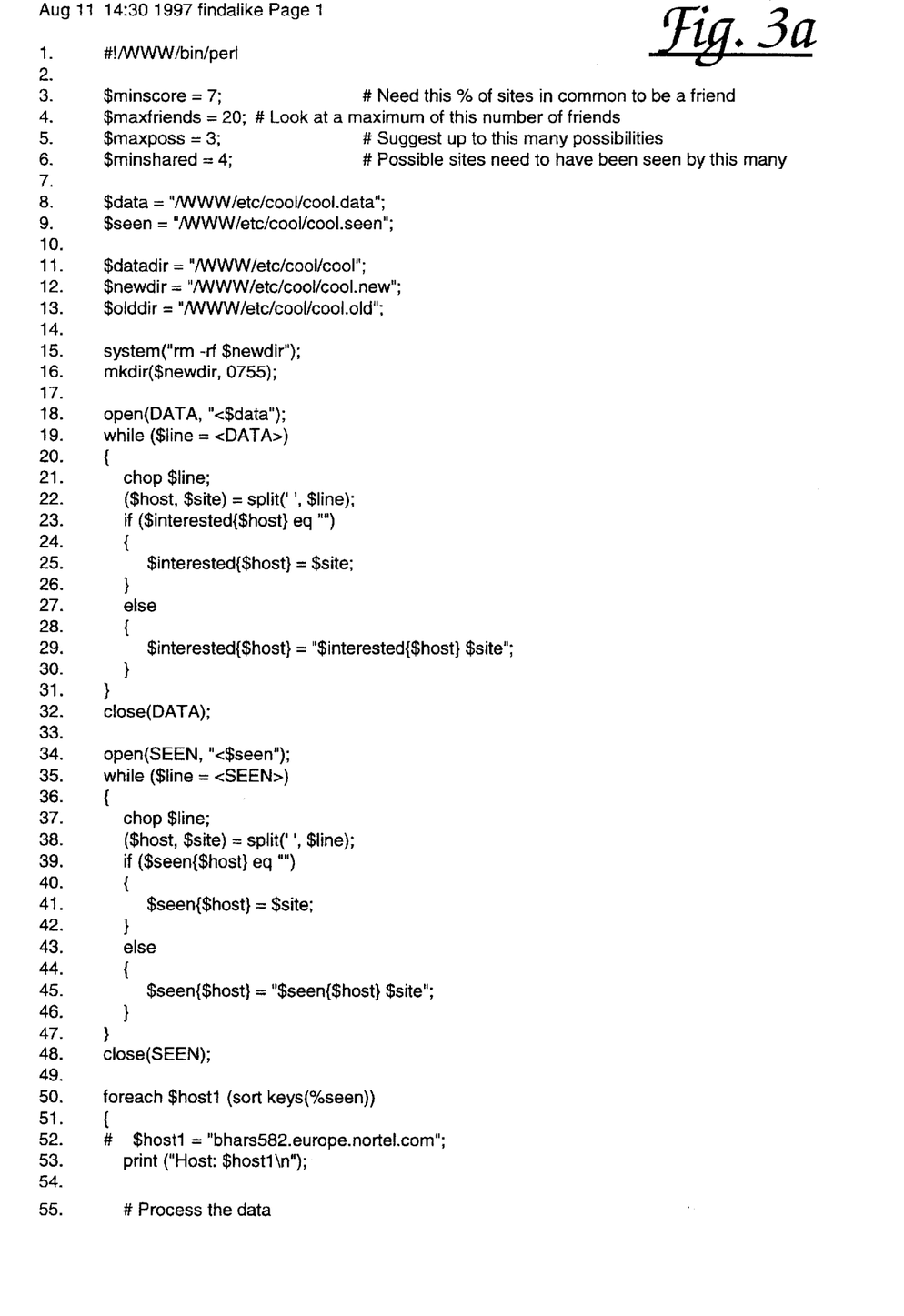
FIGS. 3a to 3d show an example of a computer program listing written in the language PERL for implementing a method for identifying information on a general purpose computer.
Figure 3B:
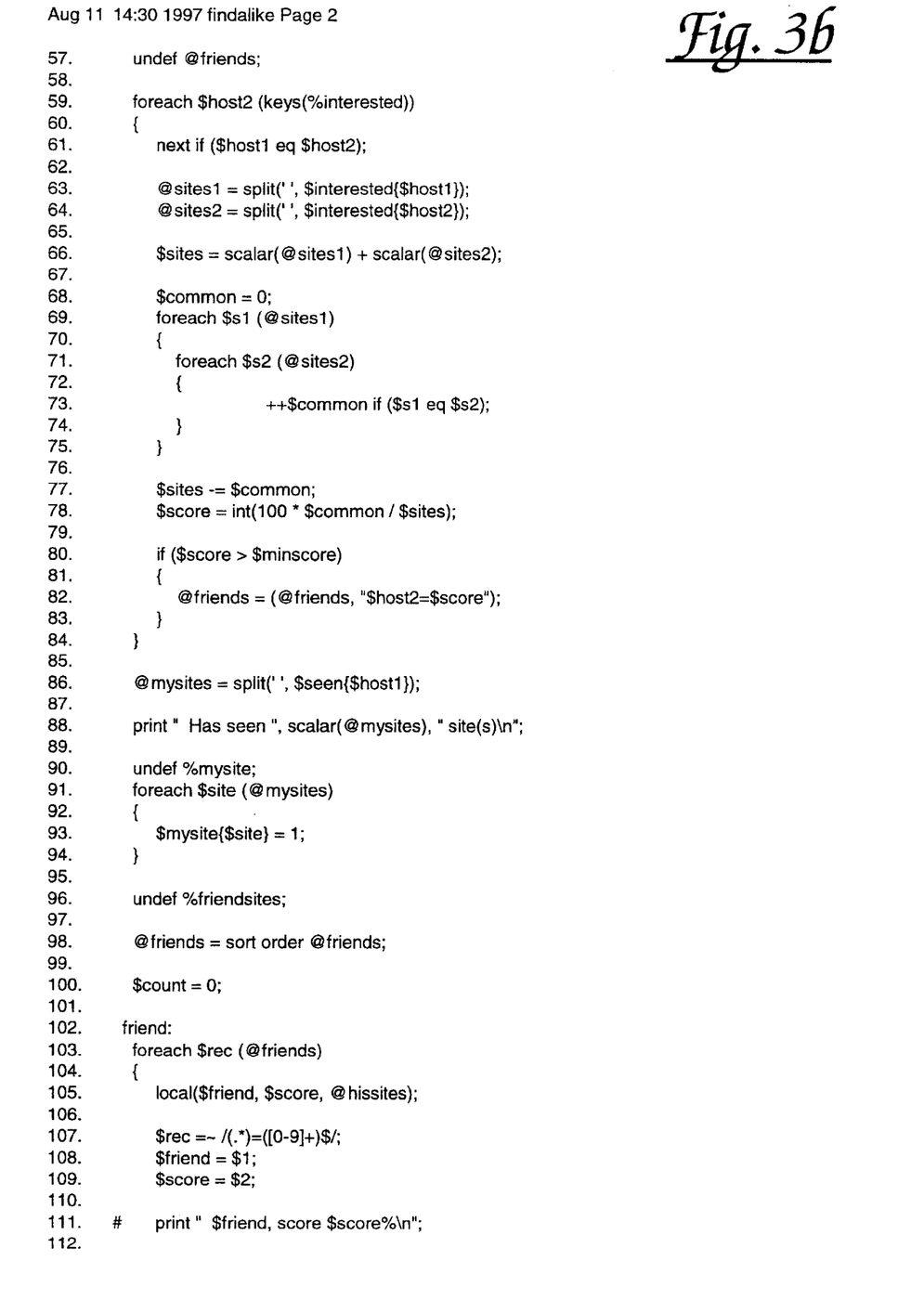
Figure 3C:
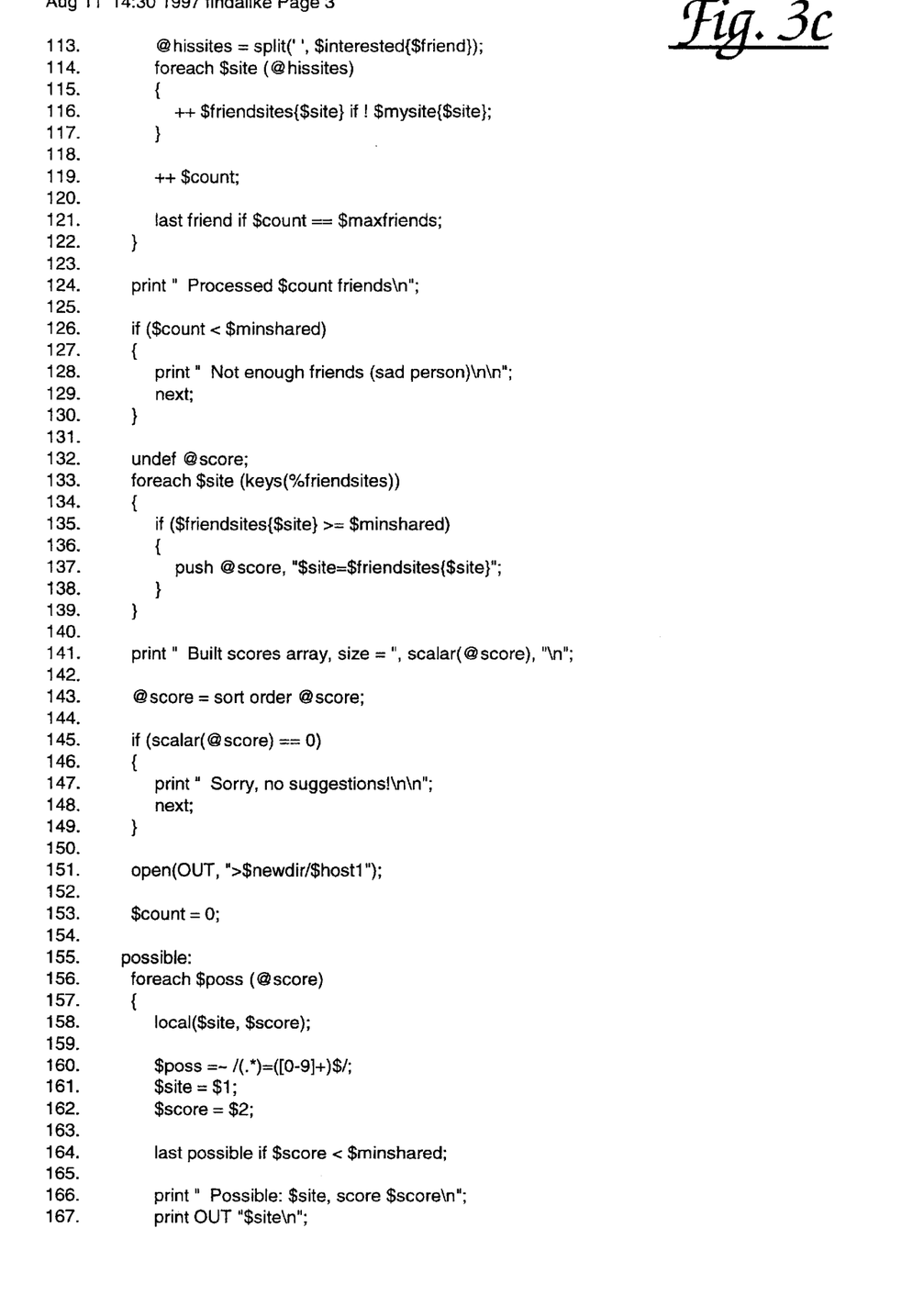
Figure 3D:
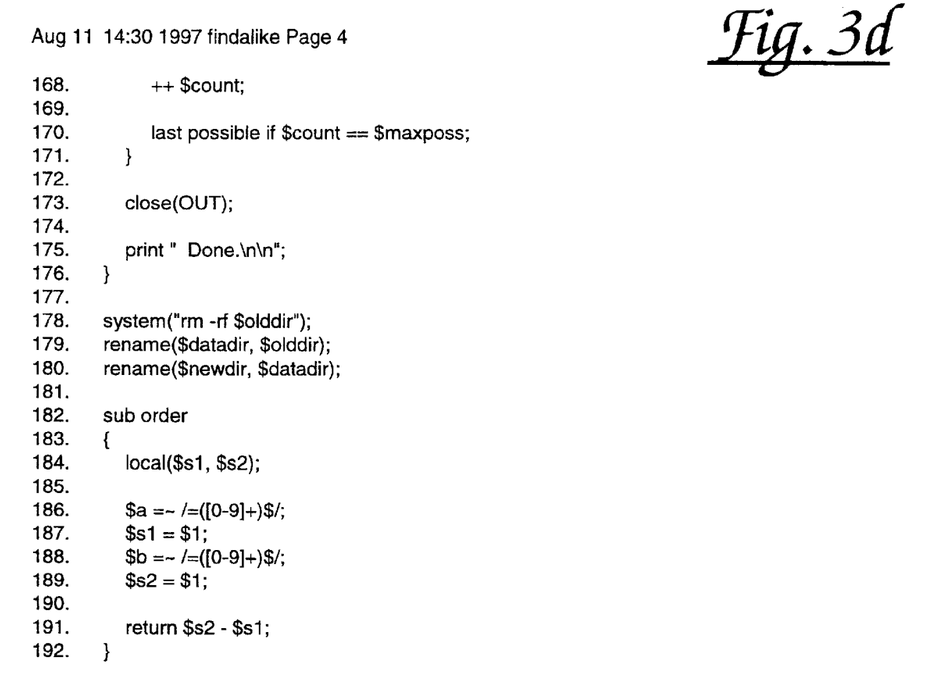

FIG. 1 shows the main steps in the method. First a record of items of information that have been requested by the each user in the group of users is obtained (box 1 in FIG. 1). For example, if the information system is the world wide web, then access logs from a proxy server could be used. FIG. 2 illustrates this situation and this is described further below.

The record can include information about requests that have been made over a certain period of time.

The next step (box 2 in FIG. 1) is to determine scores for each pair of users in the group. These scores are a rough measure of "correlation" between pairs of users with respect to which items of information they have requested. Then (box 3 in FIG. 1) friends are allocated for each user. A friend is another user in the group who has a certain degree of "correlation" with the user with respect to items of information requested.

Once friends have been allocated for each user, users can be "told" about information that their friends have requested that they have not requested. Box 4 shows how items of information are identified that have been requested by a friend of a user but which have not been requested by that user. These items will be of potential interest to the user, because they were of interest to his/her friends.

Figure 4:
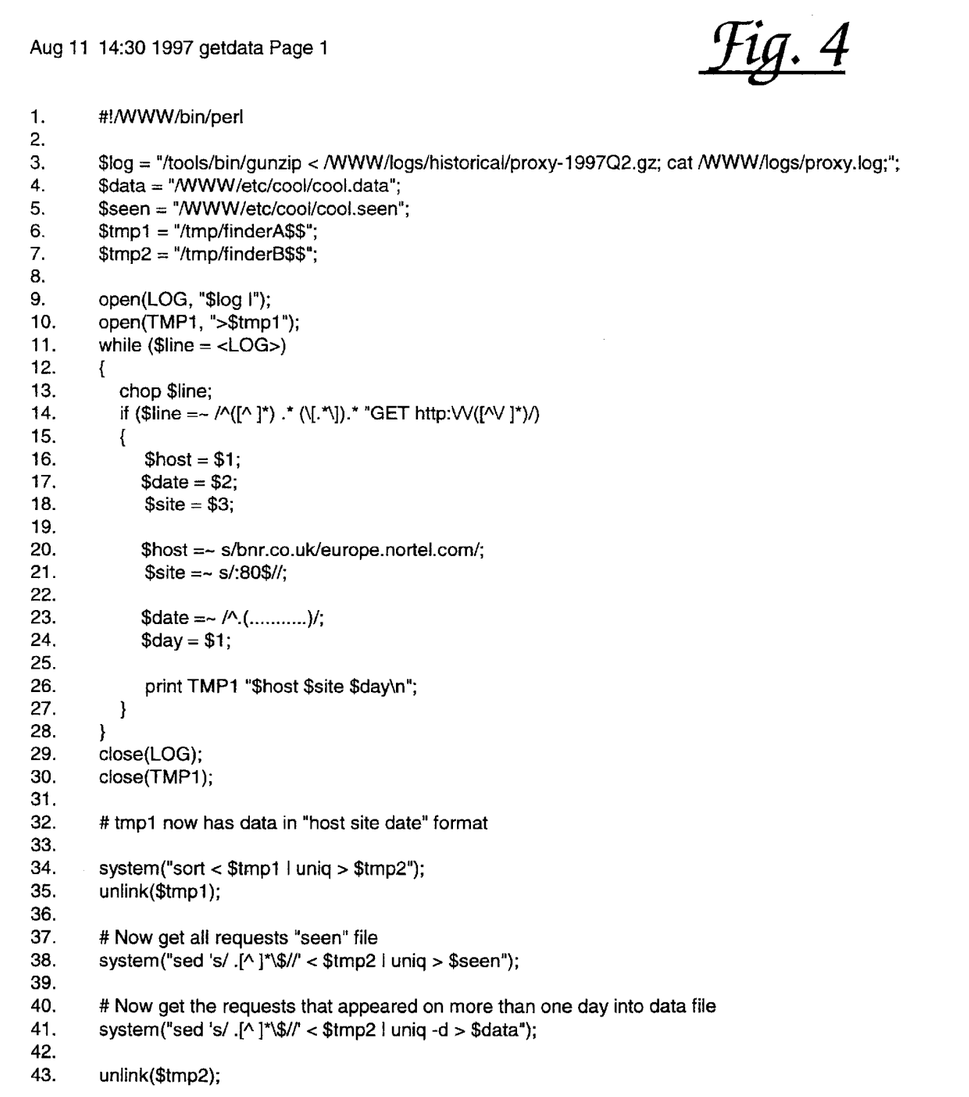
FIG. 4 is an example of a computer program listing written in the language PERL for use with the listing of FIG. 3, for implementing a method for obtaining data for use with the method of FIG. 3.

A specific example of the method is now described in detail. FIGS. 3 and 4 show examples of program listings in PERL for implementing this method. The first step involves obtaining a record of items of information requested from the information system by each user in the group. In this example, the information system is the world wide web and the record is obtained from access logs on a proxy server. As shown in FIG. 2, the world wide web 21 can be thought of as part of the internet 22. Internal networks 24, 25 are provided, for example, within the workplace and these are connected to the internet 22 via proxy servers 23, 26. For internal network 24, any users of this network must gain access to the world wide web via proxy server 23. A log of access to the world wide web 21 by users of internal network 24 is typically kept on the proxy server 23 and this log may be used for the method. Many conventional web browser applications keep an access log and these could also be used. In this case, the access log may be on the user's workstation or computer. Any means for recording or tracking the information that users have accessed can be used. The apparatus for effecting the method may also be located on the proxy server 23 but it can also be located at other points in the internal network 24 or internet 22.

Data from the access log is compiled into a file called a "seen file" because it contains information about which items of information users in the group have "seen" or requested. In the example, 80 users make up the group of users, and the seen file has a maximum size. In the example, the seen file contains information about access to the information system going back approximately 3 months with rolling contents. However, other sizes of group and time periods could be used. The seen file also contains information about the location or address of each user in order that the results of the method can be sent back to the users. In the example, the seen file effectively comprises a table with two columns, one for the web page address that was the subject of a request to the information system and a second for the user address associated with that request (i.e. what was requested and who requested it).

The next stage involves obtaining further information. This information comprises a "data file" which essentially lists what web pages have been accessed by the same person on two or more distinct dates. The data file can be made up from the information in the seen file as part of the method, or alternatively, it can be provided as input to the method.

After repeated uses of the method, the "seen" file will contain references to occasions when the group members accessed items as a consequence of being alerted to these by the method. This means that there is a danger that a type of cyclical behaviour for the method will result. This is because items identified by the method are items that friends have accessed which may have already been suggested by the method to those friends. In order to reduce the effects of this, the data file is used.

Use of the data file in conjunction with the "seen" file has been found to produce unexpectedly good results. Users are presented with items identified by the system that are particularly useful and the number of irrelevant or uninteresting items identified is reduced.

The next step is to calculate scores for each pair of users in the group. As already mentioned these scores provide a very rough measure of "correlation" between two users. Using the data file, the number of items that have been requested by both members of the pair of users is determined. The number of these items "common to both users" is then divided by the sum of the number of items seen by the first user in the pair and the second user in the pair. This is then multiplied by 100 to obtain a percentage value. Other similar measures of commonality between the users can be used.

The scores are then used to allocate friends for each user. For example, one user is considered, and for each pair of which he is a member, the other member will be his friend, if the score for that pair is above a threshold value. The threshold value is determined on a "trial and error" basis. In the example described the threshold value was 7 and in FIG. 3 this is referred to as "minscore".

For each user, a maximum number of friends are allocated and in the example, this maximum value was 20. The 20 friends with the highest scores are used if the maximum is reached. However, many users may have less than 20 friends. It is not essential to limit the number of friends in this way although this does limit the computational complexity of the process and may be required depending on the resources available to implement the method.

The next stage is to take one user and list all the items of information that his friends have requested. Then using the "seen" file, items that the user has already requested are eliminated from this list. The list then represents items of information that are potentially interesting to the user and can be presented or communicated to him. However, in order to refine the list further the following additional steps can be taken.

The list is checked to see whether any of the items it contains have been requested by several friends (in the example, items are eliminated from the list unless they have been requested by at least 4 friends; see "minshared" in FIG. 3). Then three items which have been requested by the highest number of friends are selected and these are presented to the user. These additional steps are ways of prioritising, or honing down the number of items identified for the user. These steps are not essential and other similar steps could be used to perform these functions. For example, three items could be chosen at random. In the example, the method was run over night and the results presented to the group members each morning. The results are useful and interesting for the group members.

As already mentioned FIGS. 3 and 4 list program code for implementing an example of the method. Other programming languages could be used and alternative algorithms are possible as would be obvious to a person skilled in the art.

A range of applications are within the scope of the invention. These include situations in which it is required to identify information from an information system that is used by a large number of people and where the information requested by each individual is logged. For example, the world wide web, medical and technical databases and patent databases.

What is claimed is:

1. A method of identifying items of information from an information system, for at least one of a group of users of the information system, said method comprising the steps of:

(i) obtaining a first record indicative of items of information requested from the information system by each user in the group;

(ii) obtaining a second record indicative of items of information responsive to their having been requested from the information system on more than one occasion by the same user;

(iii) for each pair of users in the group determining a score responsive to identification of a number of items from the second record requested by one user in the pair, that were also requested by the other user in the pair;

(iv) for each user allocating one or more group members as friends for that user on the basis of the scores for pairs containing that user; and (v) for each user identifying items of information responsive both to their having been requested by a friend of the user and to their not having been requested by the user.

2. A method of identifying information as claimed in claim 1 wherein said step (v) of identifying items of information further comprises the step of: for each user, only identifying items of information that have been requested by a plurality of the user's friends.

3. A method of identifying information as claimed in claim 1 which further comprises the step of, for each user, communicating the items identified for that user to that user.

4. A method of identifying information as claimed in claim 1 wherein the information system is the world wide web.

5. An apparatus for identifying items of information from an information system, for at least one of a group of users of the information system, said apparatus comprising:

(i) an obtainer arranged to obtain a first record indicative of items of information requested from the information system by each user in the group and also to obtain a second record indicative of items of information responsive to their having been requested from the information system on more than one occasion by the same user;

(ii) a determiner arranged to determine a score for each pair of users in the group said score being determined responsive to identification of a number of items from the second record requested by one user in the pair, that were also requested by the other user in the pair;

(iii) an allocator arranged to allocate, for each user, one or more group members as friends for that user on the basis of the scores for pairs containing that user; and (iv) an identifier arranged to identify, for each user, items of information responsive both to their having been requested by a friend of the user and to their not having been requested by the user.

6. An apparatus for identifying items of information as claimed in claim 5 which further comprises:

(i) a plurality of communications links, arranged to establish communications between each user and the information system;

(ii) a communications link between the obtainer and the information system; and (iii) an output from the identifier arranged to provide an indication of the identified items of information.

7. An information system comprising an apparatus for identifying items of information from the information system, for at least one of a group of users of the information system, said apparatus comprising:

(i) an obtainer arranged to obtain a first record indicative of items of information requested from the information system by each user in the group and also to obtain a second record indicative of items of information responsive to their having been requested from the information system on more than one occasion by the same user;

(ii) a determiner arranged to determine a score for each pair of users in the group said score being determined responsive to identification of a number of items from the second record requested by one user in the pair, that were also requested by the other user in the pair;

(iii) an allocator arranged to allocate, for each user, one or more group members as friends for that user on the basis of the scores for pairs containing that user; and (iv) an identifier arranged to identify, for each user, items of information responsive both to their having been requested by a friend of the user and to their not having been requested by the user.

* * * * *